United States Patent
Kim et al.

(10) Patent No.: US 8,180,638 B2
(45) Date of Patent: May 15, 2012

(54) METHOD FOR EMOTION RECOGNITION BASED ON MINIMUM CLASSIFICATION ERROR

(75) Inventors: Hyoung Gon Kim, Seoul (KR); Ig Jae Kim, Seoul (KR); Joon-Hyuk Chang, Seoul (KR); Kye Hwan Lee, Gwangmyeong-si (KR); Chang Seok Bae, Daejeon (KR)

(73) Assignee: Korea Institute of Science and Technology, Seoul (KR)

( * ) Notice: Subject to any disclaimer, the term of this patent is extended or adjusted under 35 U.S.C. 154(b) by 191 days.

(21) Appl. No.: 12/711,030

(22) Filed: Feb. 23, 2010

(65) Prior Publication Data
US 2010/0217595 A1    Aug. 26, 2010

(30) Foreign Application Priority Data
Feb. 24, 2009    (KR) .................. 10-2009-0015507

(51) Int. Cl.
*G10L 17/00*    (2006.01)
(52) U.S. Cl. ........ 704/250; 704/246; 704/247; 704/251; 704/252
(58) Field of Classification Search ................. None
See application file for complete search history.

(56) References Cited

U.S. PATENT DOCUMENTS
6,173,260 B1 *  1/2001  Slaney .................. 704/250
7,733,224 B2 *  6/2010  Tran .................... 340/540
2006/0293921 A1 * 12/2006  McCarthy et al. ........... 705/2

FOREIGN PATENT DOCUMENTS
JP    07-199987 A    8/1995

OTHER PUBLICATIONS

Kwak, H. et al., "Emotion Recognition using Prosodic Feature Vector and Gaussian Mixture Model," Proceedings of the Korean Society for Noise and Vibration Engineering Conference: The Korean Society for Noise and Vibration Engineering, Nov. 2002, pp. 762-766.

* cited by examiner

*Primary Examiner* — Leonard Saint Cyr
(74) *Attorney, Agent, or Firm* — Fenwick & West LLP

(57) ABSTRACT

Disclosed herein is a method for emotion recognition based on a minimum classification error. In the method, a speaker's neutral emotion is extracted using a Gaussian mixture model (GMM), other emotions except the neutral emotion are classified using the Gaussian Mixture Model to which a discriminative weight for minimizing the loss function of a classification error for the feature vector for emotion recognition is applied. In the emotion recognition, the emotion recognition is performed by applying a discriminative weight evaluated using the Gaussian Mixture Model based on minimum classification error to feature vectors of the emotion classified with difficult, thereby enhancing the performance of emotion recognition.

6 Claims, 2 Drawing Sheets

METHOD FOR EMOTION RECOGNITION BASED ON MINIMUM CLASSIFICATION ERROR

CROSS-REFERENCE TO RELATED APPLICATION

This application claims priority to Republic of Korea Patent Application No. 10-2009-0015507, filed on Feb. 24, 2009, and all the benefits accruing therefrom under 35 U.S.C. §119(a), the contents of which in its entirety are herein incorporated by reference.

BACKGROUND

1. Field of the Invention

The disclosure relates to a method for emotion recognition, and more particularly, to a method for emotion recognition based on a minimum classification error.

2. Description of the Related Art

IT technologies have been focused on human beings from technology and facility infrastructures. The development of IT technologies will be continuously moved to human orientation, and accordingly, the importance of services will be brought into relief. Many studies on emotion recognition have been conducted as one of core technologies for such services. Recently, interest in the emotion recognition has been increased in fields such as portable devices and robots, and has been increased as an important subject for studies in the domestic country as well as in foreign countries. The studies on emotion recognition require a technology for detecting not only a simple emotional state caused by an external factor but also preference tendency.

SUMMARY OF THE INVENTION

Disclosed herein is a method for enhancing the performance of emotion recognition by applying a discriminative weight evaluated using a Gaussian mixture model (GMM) based on a minimum classification error to feature vectors of the emotion classified with difficult.

According to an aspect, there is provided a method for emotion recognition based on a minimum classification error, the method comprising: extracting a feature vector for emotion recognition based on a voice signal generated from a speaker and a galvanic skin response (GSR) of the speaker; classifying a neutral emotion using a Gaussian mixture model (GMM) based on the extracted feature vector for emotion recognition; and classifying emotions except the previously classified neutral emotion using a Gaussian Mixture Model to which a discriminative weight for minimizing the loss function of a classification error for the feature vector for emotion recognition is applied.

In the extracting of the feature vector for emotion recognition based on the voice signal generated from the speaker and the galvanic skin response of the speaker, at least one or more feature vectors of mel frequency cepstral coefficient (MFCC), delta MFCC (ΔMFCC), pitch, music continuity counter (MCC) may be excluded from the voice signal. And a feature vector of galvanic skin responses may be extracted from the speaker.

In one embodiment, the Gaussian Mixture Model may be generated by extracting one or more feature vectors of MFCC, MFCC and pitch and MCC and a feature vector of galvanic skin responses, which are feature vectors for training, from database comprising voice signals and galvanic skin responses.

In one embodiment, other emotions except the neutral emotion may be angry and joy.

In the classifying of the emotions except the previously classified neutral emotion, the emotions may be classified by comparing a likelihood ratio having the discriminative weight applied thereto with a threshold value for classifying the emotions.

BRIEF DESCRIPTION OF THE DRAWINGS

The above and other aspects, features and advantages of the present invention will become apparent from the following description of preferred embodiments given in conjunction with the accompanying drawings, in which.

DETAILED DESCRIPTION OF THE INVENTION

Figure 1:
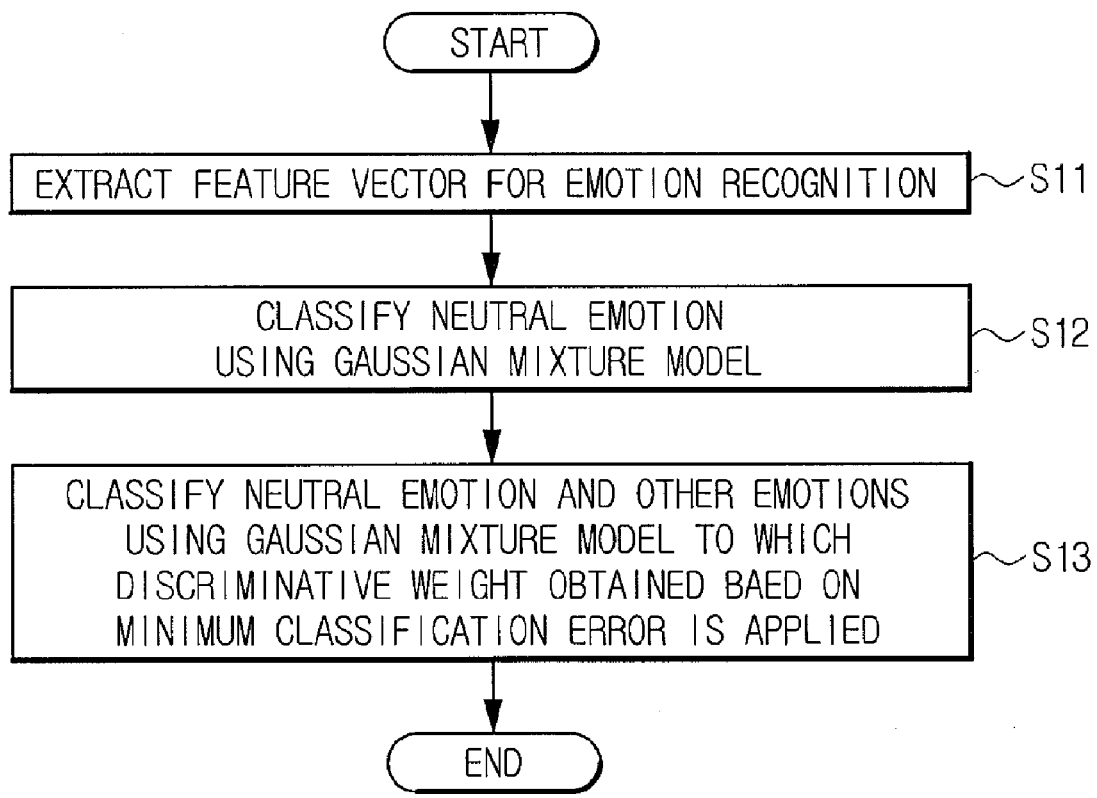
FIG. 1 is a flowchart illustrating a method for emotion recognition according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, exemplary embodiments of the present invention will be described in detail with reference to the accompanying drawings.

FIG. 1 is a flowchart illustrating a method for emotion recognition according to an embodiment.

Referring to FIG. 1, the method of this embodiment comprises: extracting a feature vector for emotion recognition based on a voice signal generated from a speaker and a galvanic skin response of the speaker (S11); classifying a neutral emotion using a Gaussian mixture model (GMM) based on the extracted feature vector for emotion recognition (S12); and classifying emotions except the previously classified neutral emotion using a GAUSSIAN MIXTURE MODEL to which a discriminative weight for minimizing the loss function of a classification error for the feature vector for emotion recognition is applied (S13).

In the extracting of the feature vector for emotion recognition based on the voice signal generated from the speaker and the galvanic skin response of the speaker (S11), a feature vector for emotion recognition is extracted, and a feature vector for the voice signal and a feature vector for the galvanic skin response are extracted to constitute the feature vector for the speaker's emotion recognition.

The feature vector extracted from the voice signal refers to a feature vector containing information on a speaker's emotion in the voice signal, and includes mel frequency cepstral coefficient (MFCC), delta MFCC (ΔMFCC), pitch, music continuity counter (MCC) and the like. In this embodiment, at least one or more of the feature vectors containing information on the speaker's emotion may be extracted, and the extracted feature vectors may be used in emotion recognition.

At this time, the MCC means a value obtained from a running mean energy, a spectrum difference, a pitch correlation and a determined threshold value.

In one embodiment, among the feature vectors, a thirteenth-order MFCC, a thirteenth-order ΔMFCC, a primary pitch and a primary MCC may constitute the feature vector for emotion recognition.

In addition to the feature vectors extracted from the voice signal, a galvanic skin response (GSR) may be additionally selected as a feature vector. In one embodiment, a primary galvanic skin response may be used as the feature vector.

Thus, 29 order feature vectors may be embodiments of the feature vectors used in the final emotion recognition. In one embodiment, a total of 29 order feature vectors may be extracted every 10 ms.

The classifying of the neutral emotion using the Gaussian Mixture Model based on the extracted feature vector for emotion recognition, the neutral emotion may be first extracted rather than other emotions using the Gaussian Mixture Model. At this time, the emotions except the neutral emotion refer to other emotions except a speaker's neutral emotion, and various emotion models may be classified to implement the emotions. In the present invention, it is characterized by first classifying a neutral emotion and then classifying other emotions except the neutral emotion. Therefore, the scope of the present invention is not limited to embodiments of emotions classified after the neutral emotion is classified.

Hereinafter, the Gaussian Mixture Model will be described.

MFCC(s), delta MFCC(s), pitch(s), MCC(s) and galvanic skin response(s), which are feature vectors for training, may be extracted from a database comprising voices and galvanic skin responses containing speaker's emotion, and the Gaussian Mixture Model (GMM) may be generated from the extracted feature vectors.

The Gaussian Mixture Model algorithm used in the method for emotion recognition is one of methods for modeling a distribution density for data into a plurality of Gaussian probability density functions.

When assuming that the feature vectors used in the emotion recognition are N D-th order feature vectors $X=\{x_1, x_2, \ldots, x_D\}$, the likelihood of an emotion recognition model comprising M mixture components is calculated by Equation 1.

$$p(\vec{x} | \lambda) = \sum_{i=1}^{M} p_i b_i(\vec{x}) \qquad (1)$$

Here, $b_i(\vec{x})$ is given as shown in Equation 2, and $p_i$ has a constraint conditions as shown in Equation 3.

$$b_i(\vec{x}) = \frac{1}{(2\pi)^{\frac{D}{2}} |\Sigma_i|^{\frac{1}{2}}} \exp\left\{-\frac{1}{2}(\vec{x} - \mu_i)^T \left(\sum_i\right)^{-1} (\vec{x} - \mu_i)\right\} \qquad (2)$$

$$\sum_{i=1}^{M} p_i = 1, \; 0 \leq p_i \leq 1 \qquad (3)$$

In Equation 2, the emotion recognition model comprises a mixture weight $p_i$, a mean vector $\mu_i$ and a covariance matrix $\Sigma_i$. The emotion recognition model is repeated using an expectation maximization (EM) algorithm until a new model $\lambda'$ that satisfy $p(x|\lambda') \geq p(x|\lambda)$ reaches a determined threshold value. At this time, the emotion recognition is performed by evaluating a model having the greatest likelihood value in the obtained posterior probabilities and then comparing the greatest likelihood value with a likelihood value for each emotion model with respect to an input signal as shown in Equation 4.

$$\hat{E} = 1 \leq \overset{argmax}{V} \leq S \sum_{t=1}^{N} \log p(\vec{x} | \lambda_V) \qquad (4)$$

$S = 3$, (1: Angry, 2: Joy, 3: Neutral)

That is, in this embodiment, the neutral emotion can be classified based on the extracted feature vector for emotion recognition through Equation 4.

In the classifying of the emotions except the previously classified neutral emotion using the Gaussian Mixture Model to which the discriminative weight for minimizing the loss function of the classification error for the feature vector for emotion recognition is applied (S13), the neutral emotion is first classified using the Gaussian Mixture Model as described above, other emotions except the neutral emotion is then classified using the Gaussian Mixture Model to which the discriminative weight obtained based on the minimum classification error is applied, thereby recognizing the speaker's emotion.

In one embodiment, the other emotions except the recognized neutral emotion are angry and joy. Hereinafter, the angry and joy will be described as embodiments of the other emotions.

In the recognition of the angry and joy for binary pattern classification, the recognition is performed by a likelihood ratio for each emotion with respect to an input signal as shown in Equation 5.

$$\Lambda = \log \frac{p(\vec{x}|\lambda_A)}{p(\vec{x}|\lambda_J)} \overset{Angry}{\underset{Joy}{\gtrless}} \eta \tag{5}$$

Here, $\eta$ denotes a threshold value for classifying the angry and joy, $\lambda_A$ denotes an angry model, and $\lambda_J$ denotes a joy model. Here, $p(\vec{x}|\lambda_A)$ denotes a probability value of the angry for the input signal, and $p(\vec{x}|\lambda_J)$ denotes a probability value of the angry for the input signal. That is, the emotion is classified based on a log likelihood ratio of the angry and joy. A new determining equation $\Lambda^\omega$ of classifying the angry and joy may be defined as shown in Equation 6. Here, the new determining equation $\Lambda^\omega$ is obtained by applying an optimized weight for minimizing the loss function value of a classification error to the determining equation $\Lambda$ of classifying the angry and joy pre-defined as shown in Equation 5. The technique of evaluating an optimized weight for minimizing the loss function value of the classification error is defined as a minimum classification error (MCE) technique.

$$\Lambda^\omega = \log \sum_{i=1}^{M} \omega_i \frac{p_i^A b_i^A(\vec{x})}{p_i^J b_i^J(\vec{x})} \overset{Angry}{\underset{Joy}{\gtrless}} \eta \tag{6}$$

Equation 6 is an equation obtained by applying the optimized weight $\omega_i$ for minimizing the loss function value of the classification error to Equation 5 that is a classification determining equation of the pre-defined angry and joy. That is, Equation 6 is a final classification determining equation to which an optimum weight for each mixture component is added. Here, the optimum weight for each mixture component is obtained by using a likelihood ratio as the feature vector and applying the likelihood ratio to the MCE technique, and the likelihood ratio is obtained based on the respective mixture components constituting the Gaussian Mixture Model of the angry and joy in the classification between the angry and joy models.

As shown in Equation 6, the angry and joy are classified based on whether the likelihood ratio having the discriminative weight applied thereto is larger or smaller than the threshold value for classifying the angry and joy. When the likelihood ratio is identical to the threshold value, the angry or joy may be classified based on the configuration of an angry or joy system.

In Equation 6, a generalized probabilistic descent (GPD)-based MCE technique may be performed to obtain a new determining equation to which an optimum weight is applied. The classification error D(t) based on actual training data performed to evaluate the optimum weight may be defined as shown in Equation 7.

$$D(\Lambda^\omega(t)) = \begin{cases} -g_A(\Lambda^\omega(t)) + g_J(\Lambda^\omega(t)): \\ \text{if current frame is Angry frame.} \\ -g_J(\Lambda^\omega(t)) + g_A(\Lambda^\omega(t)): \\ \text{if current frame is Joy frame.} \end{cases} \tag{7}$$

In Equation 7, the classification error function becomes a measure showing how different the feature vector extracted from training data is compared with an emotion classification manual based the training data. Here, t denotes a frame index. That is, the classification error is separately defined based on whether the current frame is an angry frame or joy frame.

$$g_A(\Lambda^\omega(t)) = \Lambda^\omega(t) - \theta$$

$$g_J(\Lambda^\omega(t)) = \theta - \Lambda^\omega(t) \tag{8}$$

$\theta$ in Equation 8 denotes a reference value for classifying the emotions. For example, the reference value $\theta$ may be set to "0." When Equation 8 has a negative value, it is determined that the classification between the angry and joy is correct, the loss function L based on Equations 7 and 8 is defined as shown in Equation 9. Here, the loss function L denotes the degree of an error for the actual data obtained in Equation 7.

$$L = \frac{1}{1 + \exp(-\beta D(\Lambda^\omega(t)))} \tag{9}$$

Here, $\beta$ denotes the slope of the sigmoid function. The optimum weight to be finally evaluated becomes a weight updated when the loss function value obtained using the training data is minimized. The classification between the angry and joy is performed by applying the optimum weight evaluated by the existing equation such as Equation 6 to the emotion model.

Embodiment

In order to evaluate the performance of the method for emotion recognition according to this embodiment, a test was performed by collecting data based on actual emotion classification and collecting data for voices and galvanic skin responses related to angry, joy and neutral.

First, when feature vectors (28) using voices are extracted based on the collected data, experiments were performed using a Gaussian Mixture Model so as to evaluate recognition performance. Sixteen mixture components were used in the Gaussian Mixture Model used in all the experiments. As a result, the recognition performance was 79.62%, and the recognition performance for each emotion is shown in Table 1.

TABLE 1

| Accuracy | Angry | Joy | Neutral |
| --- | --- | --- | --- |
| Angry | 90.45 | 2.71 | 6.84 |
| Joy | 9.42 | 79.04 | 11.54 |
| Neutral | 19.96 | 10.66 | 69.38 |

Average accuracy: 79.62%

Next, feature vectors (29) were extracted by adding galvanic skin responses so as to complement the feature vectors using voices. As a result, the recognition performance was 87.73%, and the recognition performance was enhanced by about 8% as compared with that when the feature vectors using only voices were extracted. The result of the recognition experiments having the galvanic skin responses added thereto is shown in Table 2.

TABLE 2

| Accuracy | Angry | Joy | Neutral |
|---|---|---|---|
| Angry | 83.71 | 13.22 | 2.07 |
| Joy | 15.06 | 83.36 | 1.58 |
| Neutral | 2.65 | 1.23 | 96.12 |

Average accuracy: 87.73%

Figure 2:
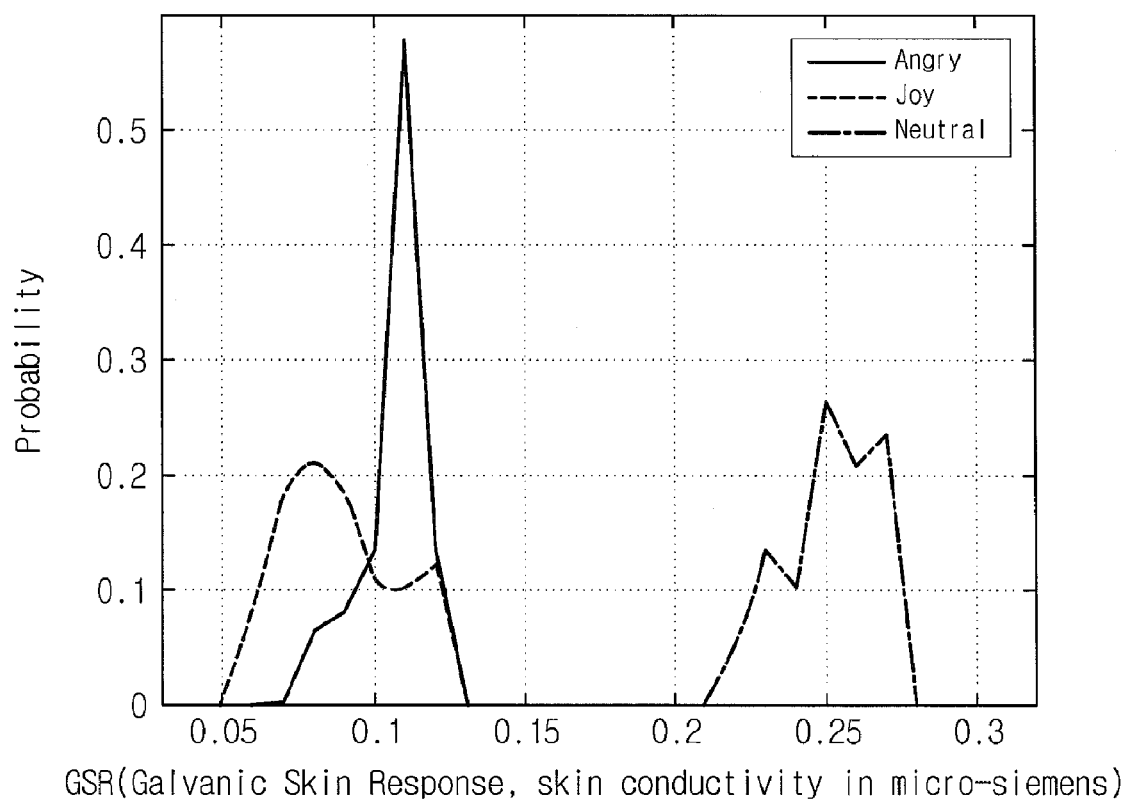
FIG. 2 is a histogram showing galvanic skin responses for three emotions.

Particularly, in the neutral emotion, the recognition performance was considerably enhanced. This is because the galvanic skin responses have a distinct distribution. FIG. 2 is a histogram showing galvanic skin responses for three emotions.

In the emotion recognition using the 29 feature vectors extracted from the finally inputted signal, the neutral emotion is classified, and then the angry and joy are classified using the Gaussian Mixture Model to which the discriminative weight is applied based on the minimum classification error, thereby enhancing the recognition performance.

The angry and joy were recognized by using the Gaussian Mixture Model using the evaluated weight and the extracted 29 feature vectors. As a result, the mean recognition rate was enhanced as compared with that using the Gaussian Mixture Model based on the minimum classification error as shown in Table 3.

TABLE 3

| Accuracy | Angry | Joy | Neutral |
|---|---|---|---|
| Angry | 86.71 | 13.22 | 2.07 |
| Joy | 12.91 | 85.51 | 1.58 |
| Neutral | 2.65 | 1.23 | 96.12 |

Average accuracy: 89.45%

According to embodiments, the emotion recognition is performed by applying a discriminative weight evaluated using the Gaussian Mixture Model based on minimum classification error to feature vectors of the emotion classified with difficult, thereby enhancing the performance of emotion recognition.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for emotion recognition based on a minimum classification error, the method comprising:
    extracting a feature vector for emotion recognition based on a voice signal generated from a speaker and a galvanic skin response of the speaker, the feature vector for emotion recognition including a voice signal feature vector containing information extracted from the voice signal of the speaker and a galvanic skin response feature vector extracted from galvanic skin response of the speaker;
    classifying a neutral emotion using a Gaussian mixture model based on the extracted feature vector for emotion recognition; and
    classifying other emotions except the previously classified neutral emotion using the Gaussian Mixture Model to which a discriminative weight for minimizing the loss function of a classification error for the feature vector for emotion recognition is applied, wherein the emotions are classified by comparing a likelihood ratio with a threshold value, and the likelihood ratio is obtained from the Gaussian Mixture Model modified by the discriminative weight.

2. The method according to claim 1, wherein the voice signal feature vector includes at least one or more feature vectors of mel frequency cepstral coefficient (MFCC), delta MFCC ($\Delta$MFCC), pitch, music continuity counter (MCC).

3. The method according to claim 1, wherein the Gaussian Mixture Model is generated by extracting one or more feature vectors of MFCC, delta MFCC, pitch and MCC and a feature vector of galvanic skin responses, which are feature vectors for training, from database comprising voice signals and galvanic skin responses.

4. The method according to claim 1, wherein other emotions except the neutral emotion are angry and joy.

5. The method according to claim 1, wherein classifying other emotions except the previously classified neutral emotion comprises:
    obtaining optimum discriminative weight for minimizing the loss function based on training data; and
    applying the optimum discriminative weight to the Gaussian Mixture Model for emotion recognition.

6. The method according to claim 5, further comprising:
    classifying emotions between angry and joy using the Gaussian Mixture Model modified by the optimum discriminative weight.

* * * * *

UNITED STATES PATENT AND TRADEMARK OFFICE
CERTIFICATE OF CORRECTION

PATENT NO. : 8,180,638 B2
APPLICATION NO. : 12/711030
DATED : May 15, 2012
INVENTOR(S) : Hyoung Gon Kim et al.

It is certified that error appears in the above-identified patent and that said Letters Patent is hereby corrected as shown below:

On the Title Page, Item (73) under the heading Assignee, after "Korea Institute of Science and Technology, Seoul (KR)" insert --Electronics and Telecommunications Research Institute, Daejeon (KR)--.

Signed and Sealed this
Twelfth Day of March, 2013

Teresa Stanek Rea
*Acting Director of the United States Patent and Trademark Office*